Nov. 24, 1970   W. L. BLOOM   3,541,781
APPARATUS FOR MEASURING TIME SPENT STANDING OR WALKING
Filed Sept. 9, 1968   2 Sheets-Sheet 1
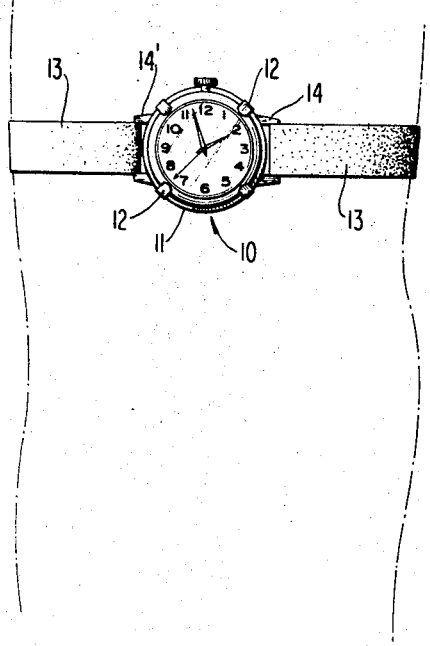
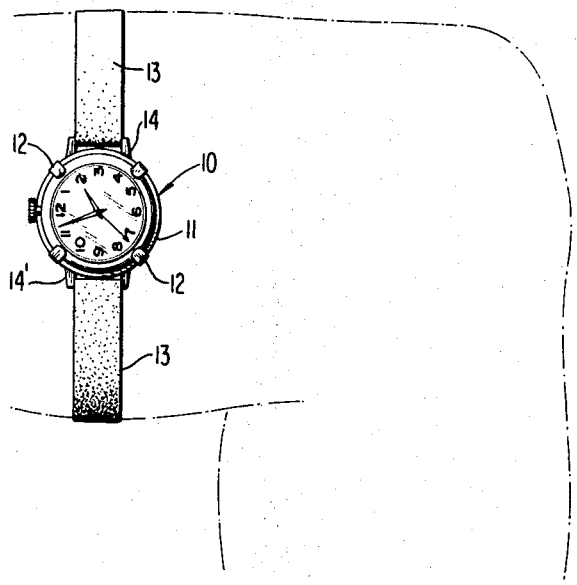
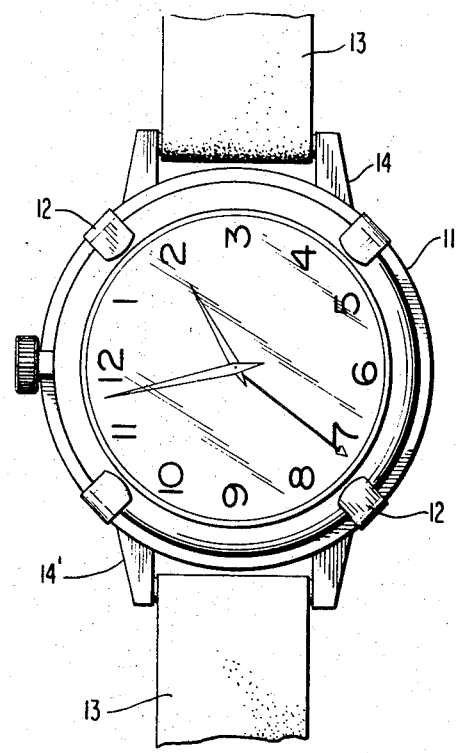
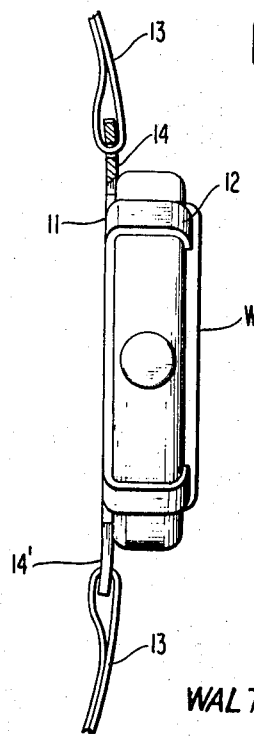
INVENTOR
WALTER L. BLOOM
BY   Newton, Hopkins,
    & Ormsby
    Attorneys Nov. 24, 1970     W. L. BLOOM     3,541,781
APPARATUS FOR MEASURING TIME SPENT STANDING OR WALKING
Filed Sept. 9, 1968     2 Sheets-Sheet 2
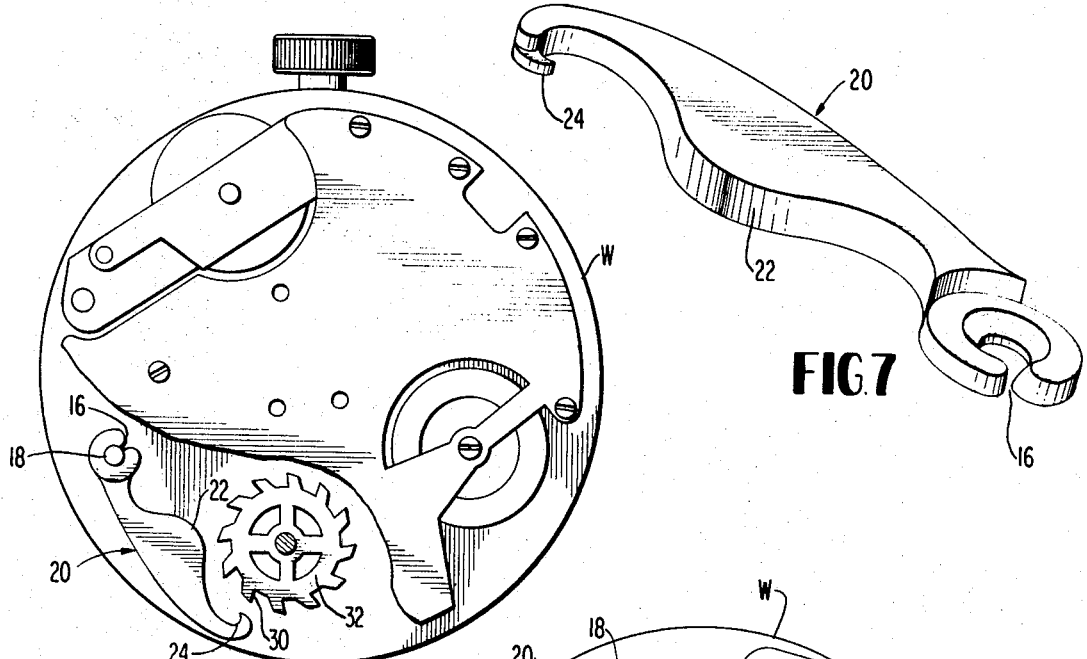
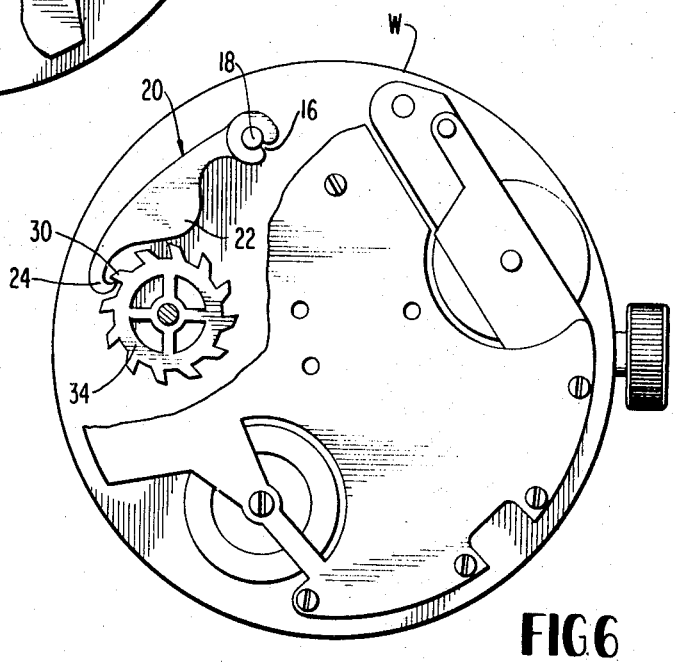
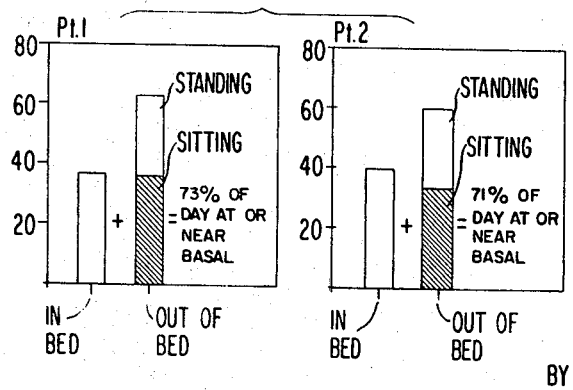
INVENTOR
WALTER L. BLOOM
Newton, Hopkins,
& Ormsby
Attorneys
BY United States Patent Office 3,541,781
Patented Nov. 24, 1970

3,541,781
APPARATUS FOR MEASURING TIME SPENT STANDING OR WALKING
Walter L. Bloom, Rte. 3, Johnson's Ferry Road, Marietta, Ga. 30060
Filed Sept. 9, 1968, Ser. No. 758,497
Int. Cl. G04f 7/04
U.S. Cl. 58—74           3 Claims

ABSTRACT OF THE DISCLOSURE

The present invention relates to a method and an apparatus for measuring the time a person spends in the upright position during a selected period. The method includes measuring the accumulation of time a person's leg is in a substantially vertical position during the selected period. The apparatus includes a watch mounted in a frame or holder that is adapted to be strapped to an individual's leg and having a pivoted weight that functions as a gravity actuated switch positioned in the watch which engages and stops the watch's gear train when the watch is rotated an angle of approximately 90° from its operating position; for example, when the wearer sits or reclines. The watch is rotatably mounted in the frame or holder to facilitate any adjustment that may be necessary for use on varying leg sizes and posture habits of different individuals.

BACKGROUND OF THE INVENTION

Field of the invention

This invention relates to a method of measuring activity through use of a mechanism for measuring the total time a person's upper leg is in a given position with respect to the horizontal, thereby determining the total time that a person spends standing or walking during any selected period of time.

Discussion of the prior art

Recently studies have been performed to measure activity habits in the natural environment of various human beings to find valid information about obesity as related to inactivity. In order to find information about obese persons, means are necessary to measure the activities as these people carry out their daily routines. Previously, photographic and other techniques have been used; however, these techniques are not amenable to the study of a patient's general activity over an extended period of time in the person's natural environment.

SUMMARY OF THE INVENTION

Since most energy measurements of obese patients indicate a high caloric expenditure at rest as well as during activity, it was important to have a precise method to evaluate the total activity of obese and lean subjects in their normal life situations. Since photographic techniques fail to conveniently follow a subject through routine daily activities, a method was sought which would indicate reliably and accurately significant information with respect to a subject's activity and which would be continuous, rather than intermittent as photographic techniques are, but which would not interfere with or tend to modify these activities.

The method which is a subject of the invention comprises measuring personal activity by attaching a timing device sensitive to its relationship with the horizontal to an individual and measuring the time the individual spends standing or walking. This is done by measuring the time the upper part of the individual's leg spends in the substantially vertical position.

The apparatus which is a subject of the invention and described herein is a watch mounted in a frame or holder strapped to the subject's upper leg. The watch is controlled by a gravity-activated switch sensitive to a 90° angle change such as occurs at the upper leg portion when changing from a standing to a sitting position. Since the switch works by gravity and the position of the device on the subject's leg varies from person to person, a rotatably adjustable holder was used. This holder is pivot-anchored to an adjustable rubber strap band. Thus, once the device is placed above the knee the watch may be rotated in its holder to insure that it stops when the individual is sitting down and starts when the individual is standing. The holding means of the present invention includes brackets to which an adjustable rubber strap or band is attached for securing the frame or holder to an individual's leg. The frame has fingers protruding generally away from the side of the frame that is in contact with a person's leg and bending outwardly toward the center of the frame conforming to the general outer contour of the timing device to be held therein. The fingers restrain the timing device but allow limited rotation in the plane of the mounting frame to allow adjustment of the device so that it is operative when the individual stands or walks and is inoperative when the individual sits or reclines.

Some objects of this invention are to provide a method:
(a) That measures a person's activity level realistically in his natural environment during the subject's daily routine;
(b) That is reliable, simple and inexpensive; and
(c) That measure the total time a person spends in his feet either walking or standing in any selected period.

Another object of this invention is to provide a simple, inexpensive, rugged and durable mechanical device to measure the total time a person spends on his feet during a selected time period and which can be worn comfortably by a person and which will not interfere with that person's routine activities.

This invention possesses many other objects, features, and advantages which are more clearly apparent from a consideration of the following description of the embodiment of the invention chosen for illustration.

BRIEF DESCRIPTION OF THE DRAWINGS

FIG. 1 is a pictorial view of the manner of mounting the device of the present invention placed upon the upper leg or thigh of the user, the individual's leg being in the vertical or near vertical position as it would be in standing or walking;

FIG. 2 is a view similar to FIG. 1 but illustrating the orientation of the device when the individual's upper leg is rotated to the horizontal position as it would be when sitting or lying down;

FIG. 3 is a front elevational view showing the watch or timing means mounted in its frame or holder;

FIG. 4 is a top plan view showing the watch or timing means mounted in its frame or holder with a portion in section;

FIG. 5 is a rear elevational view of the watch mechanism viewed with the rear cover removed showing the relationship of the gravity switch to the gear teeth of the watch's gear train when the watch is in operating position as in FIG. 1;

FIG. 6 is a rear elevational view similar to FIG. 5, but illustrating the watch rotated 90° and with the gravity switch engaging a tooth of the watch's gear train when the watch is in non-operating position as in FIG. 2;

FIG. 7 is a pictorial view of the gravity switch removed from the watch and illustrating its general configuration;

FIG. 8 is a graphic analysis of the daily activity of two obese women;

DESCRIPTION OF AN ILLUSTRATIVE EMBODIMENT

The method of the present invention is to mount the device described below and as shown in the accompanying drawing onto an individual's leg when the individual is either sitting or lying (FIG. 2) and rotating the watch W in the frame or holder 11 until the gravity switch weight 20 engages the escapement gear 32 causing the watch to stop and further adjusting the watch in the holder so that the gravity switch weight 20 disengages the escapement gear 32 when the individual is standing or walking as shown in FIG. 1. The watch is set at 12:00 at the beginning of the measurement period and runs while the user is either sitting or standing, thereby showing the total time the individual has spent on his feet at the end of a selected measurement period.

The apparatus 10 includes a watch W of a conventional type that is rotatively mounted in a frame or holder 11 by means of a plurality of fingers 12 projecting from the frame 11 and partially surrounding the watch W. The frame 11 is generally circular in its overall plan (FIG. 3) and is provided with brackets 14 and 14′ through which passes a strap 13. The strap 13 is adjustable and is used to attach the frame or holder 11 carrying watch W to the leg of a person as shown (FIGS. 1 and 2). The watch 10 may be rotated in the frame or holder 11 for adjustment purposes about 90° limited by projection of the watch adjustment and winding stem 15 interfering with the fingers 12.

Referring to FIGS. 5 and 6, a gravity switch weight 20 is pivotally mounted at a slotted end 16 to a post 18 which is a normal structural member of the watch. The gravity switch weight has a center section 22 which is as large as practicable without interfering with any part of the watch or its mechanism through the arc of rotation it describes. The gravity switch weight 20 will rotate toward the center of the watch when the watch is in the position shown in FIG. 6 until a gear engaging catch end 24 of the gravity switch weight 20 contacts the leading edge of a tooth 30 of the escapement gear 32 thus restraining the gear 32 from the rotation. This restraint of the escapement gear 32 causes immediate stopping of the watch W as the gravity switch weight 20 moves into engagement with the escapement gear 32. When the watch is returned to the position shown in FIG. 5, the gravity switch weight 20 will, under the influence of gravity, rotate away from the center of the watch, thereby disengaging the catch end 24 of the gravity switch 20 and the leading edge of the tooth 30 of the escapement gear 32, thus allowing the watch W to continue to run.

OPERATION OF DEVICE AND USE OF METHOD

The watch is wound each morning on arising, set at 12:00, placed above the knee and checked for operation. At bedtime the watch is removed and its time is recorded. A reading of 5:15 indicates five hours and fifteen minutes standing. The patients are also given a card to record this information daily as well as the time they retire and arise. The results are then converted to minutes and calculated by standard statistical methods.

The obese and lean subjects were fitted with the watch and readings were taken for various periods of time, the shortest being two days and the longest period 35 days. Most of the studies (84 percent) were six days or longer. The obese patients were markedly overweight; one patient who weighed 155 was 20 percent overweight for her age, sex, and height. She also had increased skinfold thickness (tape measurement) on the abdomen, hips, and thighs. The patients all pursued their normal activities during the study.

RESULTS

The results are divided into three time segments of normal activities: (1) time in bed; (2) time out of bed; (3) time standing. The three segments provide a simple measure of activity levels. The obese and lean subjects spend different amounts of time in bed. The obese spend an average for the group of 65±10 (S.E.) minutes more time in bed. This is significant at 0.01 percent level. The counterpart study of time out of bed is consequently also significantly different, since time out of bed is determined by subtracting the time in bed from 1,440 (the minutes per day). To further evaluate the significance of this data, an analysis of variance showed a F value of 5.38 for between group variance. This means that the difference in time in bed between obese as a group and lean as a group was significant between a 5 and 2.5 percent level. The most striking contrast in activity is found in the difference in time that the obese and lean spend on their feet. This can be calculated in many ways. In Table 1 the figures may be evaluated as the percent of the day subjects spend on their feet, or the percent of time out of bed spent on their feet. These results show that the obese spent 21.7 percent and the lean 36.0 percent of the day in a position which might raise their energy expenditure level above normal. The 15 percent difference is significant at a 1 percent level. The time standing is comparison to the time out of bed is 17 percent greater for the lean patients. Analysis of variance comparing the obese as a group and the lean as a group for time standing shows the group F value to be 6.29 which means that the difference between obese and lean is significant between a 5 and 1 percent level. Thus in a random study without regard to occupation, a group of seven obese subjects were found to spend almost one hour per day longer in bed and significantly less time on their feet each day.

A graphic demonstration of the activity of the two obese women (FIG. 8) emphasizes the inactivity of the first two obese women (Table 1).

TABLE I

| Patient | Days | Sex | Weight | In bed | Out of bed | Standing | Percent of day on feet | Percent out of bed on feet |
|---|---|---|---|---|---|---|---|---|
| Obese: | | | | | | | | |
| 1 | 18 | F | 220 | 540±53 | 901±55 | 390±105 | 27 | 43 |
| 2 | 35 | F | 250 | 570±50 | 869±50 | 419±88 | 29 | 49 |
| 3 | 7 | M | 300 | 514±30 | 926±30 | 232±80 | 16 | 25 |
| 4 | 7 | F | 165 | 548±75 | 891±75 | 231±106 | 16 | 26 |
| 5 | 6 | F | 215 | 478±30 | 962±30 | 350±135 | 24 | 37 |
| 6 | 7 | F | 208 | 456±30 | 983±83 | 504±50 | 35 | 51 |
| 7 | 2 | M | 306 | 600±120 | 840±120 | 220±57 | 15 | 26 |
| | | | | | | | 21.7±4.1* | 36.0±4.6 |
| Lean: | | | | | | | | |
| 8 | 7 | F | 115 | 495±59 | 945±59 | 541±64 | 38 | 57 |
| 9 | 2 | F | 120 | 495±42 | 945±42 | 515±91 | 36 | 55 |
| 10 | 7 | M | 145 | 480±11 | 959±11 | 356±77 | 25 | 37 |
| 11 | 7 | F | 105 | 427±35 | 1,013±37 | 612±86 | 43 | 61 |
| 12 | 7 | F | 120 | 415±54 | 1,024±54 | 564±70 | 39 | 55 |
| 13 | 6 | F | 115 | 558±91 | 881±91 | 462±57 | 32 | 53 |
| | | | | | | | 35.5±2.3 | 53.0±3.1 |

*Standard error. (Numbers used are minutes.)

Only 27 of 29 percent of 24 hours was spent standing upright. The remainder of the time was spent at or near basal conditions. In terms of energy expenditure, these patients might as well have been in bed three-fourths of the day.

There is ample evidence in experimental animals that inactivity is a major factor in obesity. Mice with hereditary obesity may also carry the Waltzing gene. The animals with high energy expenditure gain only 30 percent of the weight over the nonobese mice. In contrast, the sedentary obese mice (without the Waltzing gene) gain 200 to 300 percent more weight than the nonobese. These hereditary obese mice were 50 to 100 percent less active than the nonobese and the inactivity antedates the obesity.

In man the evidence is equally convincing that physical activity and energy expenditure above basal is an increasingly important factor in our current problems of obesity.

CONCLUSION

The studies have shown by simple means that a small random sample of obese subjects are less active than a comparable group of lean subjects. Occupation was not a problem in this study since all the women were housewives. Undoubtedly, occupation could be a factor of time spent on one's feet. Now that we have a simple means of measuring the time spent standing, it will be possible to compare activity levels of groups, age, or occupation.

It is correct to assume that with few exceptions in our American society, the only significant energy utilization above basal is spent in the upright position. The mere fact that one is standing does not mean they are moving. In this laboratory, pedometers tested on the individual on the treadmill were grossly inadequate and a project is under way to develop a method of evaluating activity while the patient is standing. Even if it were assumed in our studies that there was equal walking in each group, the lean are still significantly more active than the obese. The obese burn more calories at a given task than the lean, thus if they had comparable activity to lean persons, the obese would have a much higher total energy expenditure. However, if this were the case, and the caloric intake was comparable in the two groups, obesity would not be a problem.

It will be obvious to those skilled in the art that many variations may be made in the embodiment chosen for the purpose of illustrating the present invention without departing from the scope thereof as defined by the appended claims.

I claim:

1. A device for measuring the time an individual spends standing or walking, comprising a watch mechanism of conventional construction having an escapement including a toothed gear, and a weight pivotally mounted at one end adjacent the gear and having a catch at its other end adapted to engage a tooth of the gear when the weight swings into one position and to be disengaged therefrom when the weight swings into another position, and means for securing the watch mechanism to an individual's upper leg portion in such a position that the pivoted weight will cause the catch to engage the gear when the wearer's leg is in one position with respect to the vertical and to be disengaged upon a movement of approximately ninety degrees from such position.

2. The device of claim 1 in which the weight is so positioned that the catch will engage the gear when the portion of the wearer's leg to which the device is attached is in a horizontal position and will release it when such portion of the leg is in a vertical position.

3. The device of claim 1 wherein the means for securing the watch mechanism to the leg of an individual comprises a holder adapted to be secured to the leg and including a frame and a plurality of fingers projecting from the frame and partially surrounding the watch mechanism, said fingers frictionally engaging such mechanism to permit it to be rotated to a desired adjusted position.

References Cited

UNITED STATES PATENTS

| | | | |
|---|---|---|---|
| 373,975 | 11/1887 | Hammond | 58—145 X |
| 376,602 | 1/1888 | Kettlewell et al. | 58—74 X |
| 1,750,078 | 3/1930 | Willheim | 58—145 |
| 2,833,348 | 5/1958 | Almquist | 58—145 |
| 3,165,883 | 1/1965 | Nash et al. | 58—145 X |

RICHARD B. WILKINSON, Primary Examiner

G. H. MILLER JR., Assistant Examiner